United States Patent
Tamenaga

(10) Patent No.: US 8,343,003 B2
(45) Date of Patent: Jan. 1, 2013

(54) JOINT DRIVING APPARATUS FOR ROBOT

(75) Inventor: Jun Tamenaga, Aichi (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 1062 days.

(21) Appl. No.: 12/155,809

(22) Filed: Jun. 10, 2008

(65) Prior Publication Data

US 2008/0305908 A1    Dec. 11, 2008

(30) Foreign Application Priority Data

Jun. 11, 2007 (JP) .................................. 2007-154323

(51) Int. Cl.
*F16H 1/32* (2006.01)
(52) U.S. Cl. ......................................... 475/168; 475/162
(58) Field of Classification Search .................. 475/162, 475/163, 168, 177–178
See application file for complete search history.

(56) References Cited

U.S. PATENT DOCUMENTS

| 7,785,223 B2 * | 8/2010 | Haga et al. ..................... 475/162 |
| 2008/0045369 A1 * | 2/2008 | Tamenaga ....................... 475/160 |

FOREIGN PATENT DOCUMENTS

| CN | 1727724 A | 2/2006 |
| EP | 1918611 A1 | 5/2008 |
| JP | 2004-084920 | 3/2004 |
| JP | 2007056897 A * | 3/2007 |
| JP | 2008-23711 | 2/2008 |
| WO | 2006/073182 | 7/2006 |
| WO | WO2007/032400 A1 | 3/2007 |

* cited by examiner

*Primary Examiner* — Justin Holmes
(74) *Attorney, Agent, or Firm* — Squire Sanders (US) LLP

(57) ABSTRACT

A joint driving apparatus for a robot comprises an oscillating internally meshing reduction mechanism, a center shaft member, a ring portion, and an oil seal disposed between the ring portion and the center shaft member. The oscillating internally meshing reduction mechanism is fixed to a first member and rotates the second member relatively with respect to the first member. An output member is arranged at the side of an external gear in an axial direction so as to output a relative rotation of an internal gear with the external gear. The center shaft member is fixed to the output member, and has a shaft portion extending up to the side opposite to the external gear in the axial direction of the output member. The ring portion is integrally formed with the first member and faces to the shaft portion of the center shaft member. The oil seal is disposed between the ring portion and the shaft portion.

7 Claims, 6 Drawing Sheets

JOINT DRIVING APPARATUS FOR ROBOT

BACKGROUND OF THE INVENTION

1. Field of the Invention

The present invention relates to a joint driving apparatus for a robot.

2. Description of the Related Art

For example, International Publication No. WO2007/032400A1 has proposed an apparatus for driving joint portions of a robot. As shown in FIG. 6, the joint driving apparatus 10 is fixed to a base 12 constituting a part of a robot (not illustrated) and supports and drives a movable member 14 constituting another part of the robot so as to rotate freely.

The joint driving apparatus 10 is equipped with a reduction mechanism 18 for reducing the rotation of a motor 16. A driving power of the motor 16 is transmitted in order of an input gear (not illustrated) mounted on a motor shaft 20, an external gear 22, one eccentric body shaft 24 (illustrated), and an eccentric body shaft gear 25 provided on the eccentric body shaft 24, and reaches a center gear 23. The center gear 23 is meshed with eccentric body shaft gears 25 (not illustrated) provided respectively on other two eccentric body shafts 24 (not illustrated), thereby rotating three eccentric body shafts 24 (only above one shaft is illustrated).

Eccentric bodies 26A, 26B are integrally formed on the eccentric body shaft 24. The eccentric bodies 26A, 26B rotate in an eccentric manner, then external gears 28A, 28B eccentrically rotate while being internally meshed with an internal gear 30.

The joint driving apparatus 10 is constituted in such a manner that a rotational component of an eccentric rotation of these external gears 28A, 28B is output through first and second carriers 32A, 32B (output members) and transmitted to the movable member 14 via a bolt 34.

A through hole 36 is formed axially at a center of the joint driving apparatus 10. A control cable (wire harness) 40 for controlling the posture of the robot penetrates the through hole 36. A seal mechanism made with a hollow cylinder 41 and O-rings 43, 45 is provided for sealing inside and outside the reduction mechanism 18. An oil seal 44A is arranged between the first carrier 32A and a casing 31 for sealing inside and outside of the reduction mechanism 18, and an oil seal 44B for the same purpose is arranged between the second carrier 32B and the casing 31.

In the joint driving apparatus 10 of the robot, the oil seals 44A, 44B for sealing inside and outside of the reduction mechanism 18 are arranged between the first carrier 32A and the casing 31, and between the second carrier 32B and the casing 31 respectively. This is because that in a case where the first carrier 32A and the second carrier 32B, which are output members, are arranged at the axial side of the external gear, and where the oil seals 44A, 44B are arranged between the first or second carrier 32A or 32B and the first member of the robot respectively, it is the most natural and easiest way to arrange the oil seals 44A, 44B at the outermost peripheral portion of the first and second carriers 32A, 32B.

However, in the above constitution, the oil seals 44A, 44B are extremely large in diameter to result in a larger seal area, thus easily lowering the sealing stability against leakage. Further, although the output members (the first and second carriers 32A, 32B) are basically low in peripheral speed, a fast speed is found at the outer peripheral portion where the diameter is large, thereby easily causing wear due to sliding motions. Thus, a problem is posed that the service life of the oil seals 44A, 44B is shortened, thereby, making it difficult to maintain stable sealing characteristics for a long time.

SUMMARY OF THE INVENTION

The present invention has been made for solving the above-described conventional problem, an object of which is to provide a joint driving apparatus for a robot capable of maintaining more favorable sealing characteristics for a long time in sealing inside and outside of the joint driving apparatus for a robot.

The present invention, which is a joint driving apparatus for a robot, comprises an oscillating internally meshing reduction mechanism, a center shaft member, a ring portion, and an oil seal disposed between the ring portion and the center shaft member. An oscillating internally meshing reduction mechanism is fixed to a first member and rotating a second member relatively with respect to the first member. The first member constitutes a part of a fixing block of the robot. The second member constitutes a part of a movable block of the robot. The oscillating internally meshing reduction mechanism comprises an external gear, an internal gear meshing with the external gear, and an output member arranged at the side of the external gear in an axial direction so as to output a relative rotation of the internal gear with the external gear. The output member is connected to the second member.

The center shaft member is integrally formed with the output member. The center shaft member is a hollow shaft with a hollow portion penetrating through the central part of the oscillating internally meshing reduction mechanism. The center shaft member has a shaft portion which extends axially beyond the output member, up to the side opposite to the external gear.

The ring portion is integrally formed with the first member and extended inwardly at the side opposite to the external gear in the axial direction of the output member. The ring portion faces the shaft portion of the center shaft member.

The oil seal is disposed between the ring portion and the center shaft member faced to the ring portion. The center shaft member rotates relatively with the ring portion. As a result, the present invention has solved the above problem.

In the present specification, the description "integrally formed" is used with such a meaning that "two members (constituents) are consequently united and constituted so as to move in an integrated manner. In other words, such a constitution is also acceptable that another member may be projected or extended from one member itself, two members may be united by some fixing means, or two members may be united by a third member placed therebetween.

In the present invention, the center shaft member which moves with the output member in an integrated manner is arranged at the center of the reduction mechanism, which is to be effectively utilized. In other words, in the present invention, the center shaft member is extended axially as a "shaft portion" up to the side opposite to the external gear beyond the output member arranged at the side of the external gear (a position going beyond an axial position of the output member over to the side opposite to the reduction mechanism). On the other hand, a member integrally formed with the first member is extended inwardly as a "ring portion" so as to face the shaft portion at the side opposite to the external gear in the axial direction of the output member. The oil seal is arranged between the ring portion and the center shaft member thus facingly placed.

Since the center shaft member is integrally formed with the "output member", it originally rotates very slowly. Further, since the center shaft member is located at a place closest to the center of the reduction mechanism (while a member integrally rotating with the output member arranged at the side of the external gear in the axial direction), the peripheral speed of the center shaft member is much slower than at the outer peripheral portion of the output member positioned at the side of the external gear. Therefore, the oil seal is extremely small in wear and greatly improved in endurance. Further, the oil seal can be made smaller in radius, thus making it possible to reduce a seal area (sliding area) and maintain the sealing performance at a higher level.

Further, the center shaft member integrally formed with the output member (moving slowly) is arranged at the center part of the reduction mechanism, thereby when a wiring for a robot is allowed to pass through a through hole of the center shaft member, the wire harness can be effectively prevented from being severely worn.

In addition, in a case where a clearance is sealed between the output member and the first member positioned outside the external gear in the axial direction, the output member is casted, with the dimensions taken into account. Conventionally, when the thus casted output member has been used as a sliding plane, there is often found a porous area (small holes) on the sliding plane, to result in leakage. Furthermore, when the oil seal is slid on the casted portion, wear and damage easily occur to the oil seal. In the present invention, the shaft portion of the center shaft member integrally formed with the output member can be used as a sliding plane, thus making it possible to easily select materials other than a casting. For example, when steel or the like is used as a material of the center shaft member, the above-conventional problem due to the casted sliding plane is easily eliminated.

According to the present invention, a high sealing performance can be maintained for a long time, and a wire harness in a center shaft member can be prevented from being worn.

DETAILED DESCRIPTION OF THE PREFERRED EMBODIMENTS

Exemplary embodiments of the present invention will now be described in detail with reference to the accompanying drawings.

Figure 1:
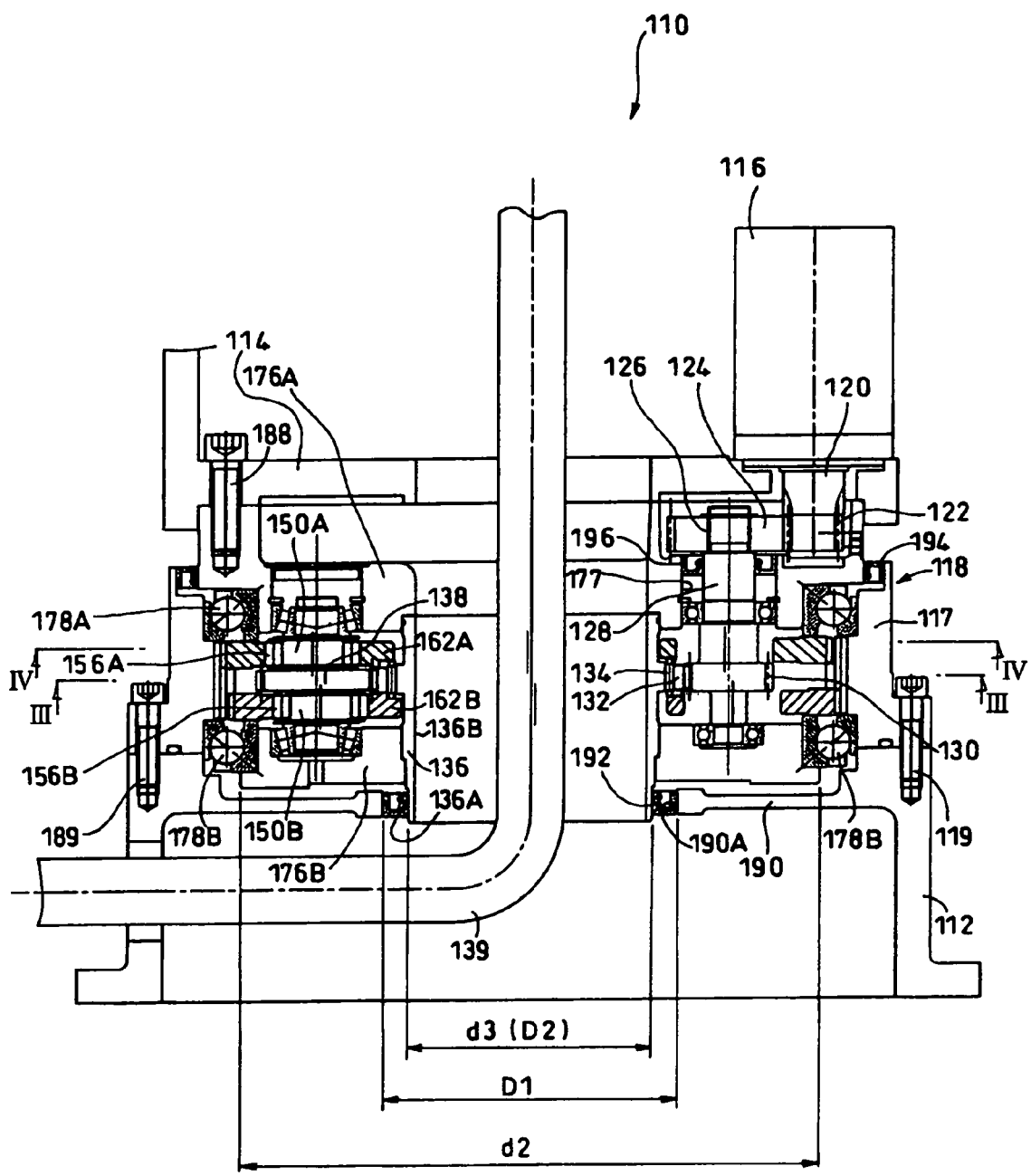
FIG. 1 is a longitudinal sectional view of a joint driving apparatus for a robot to which one embodiment of the present invention is applied.
Figure 2:
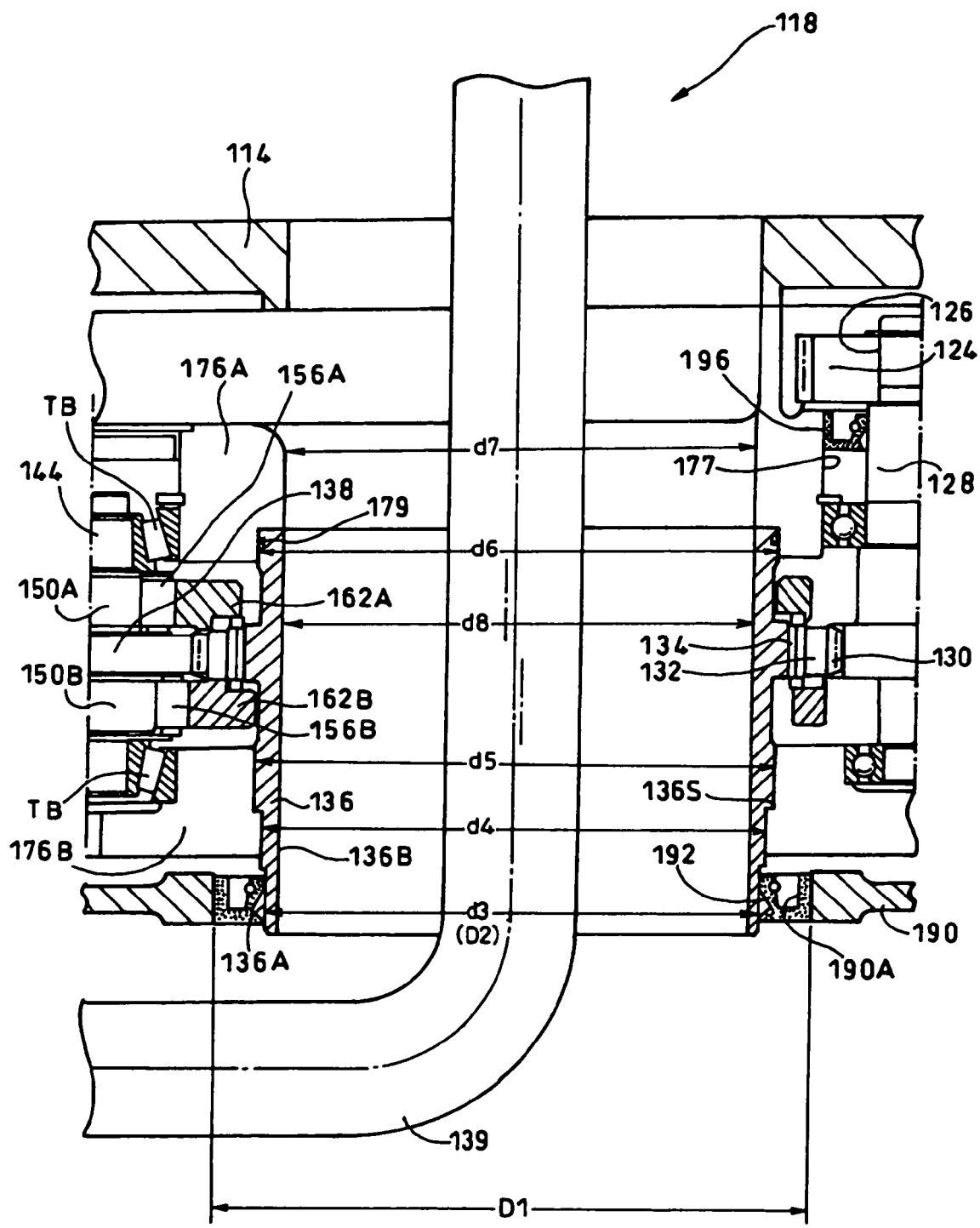
FIG. 2 is an enlarged sectional view of major parts in FIG. 1.
Figure 3:
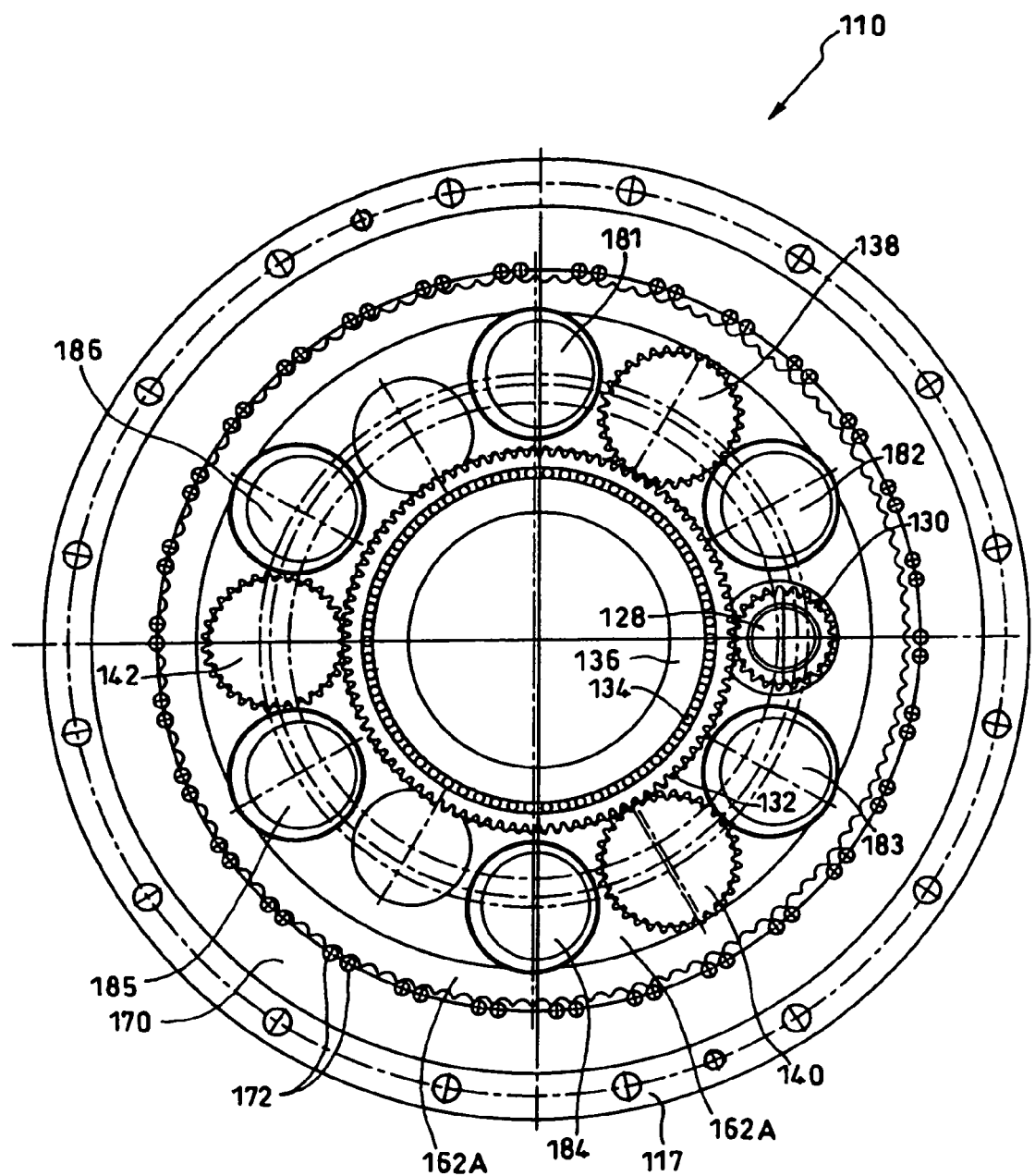
FIG. 3 is a sectional view taken along line III to III in FIG. 1.
Figure 4:
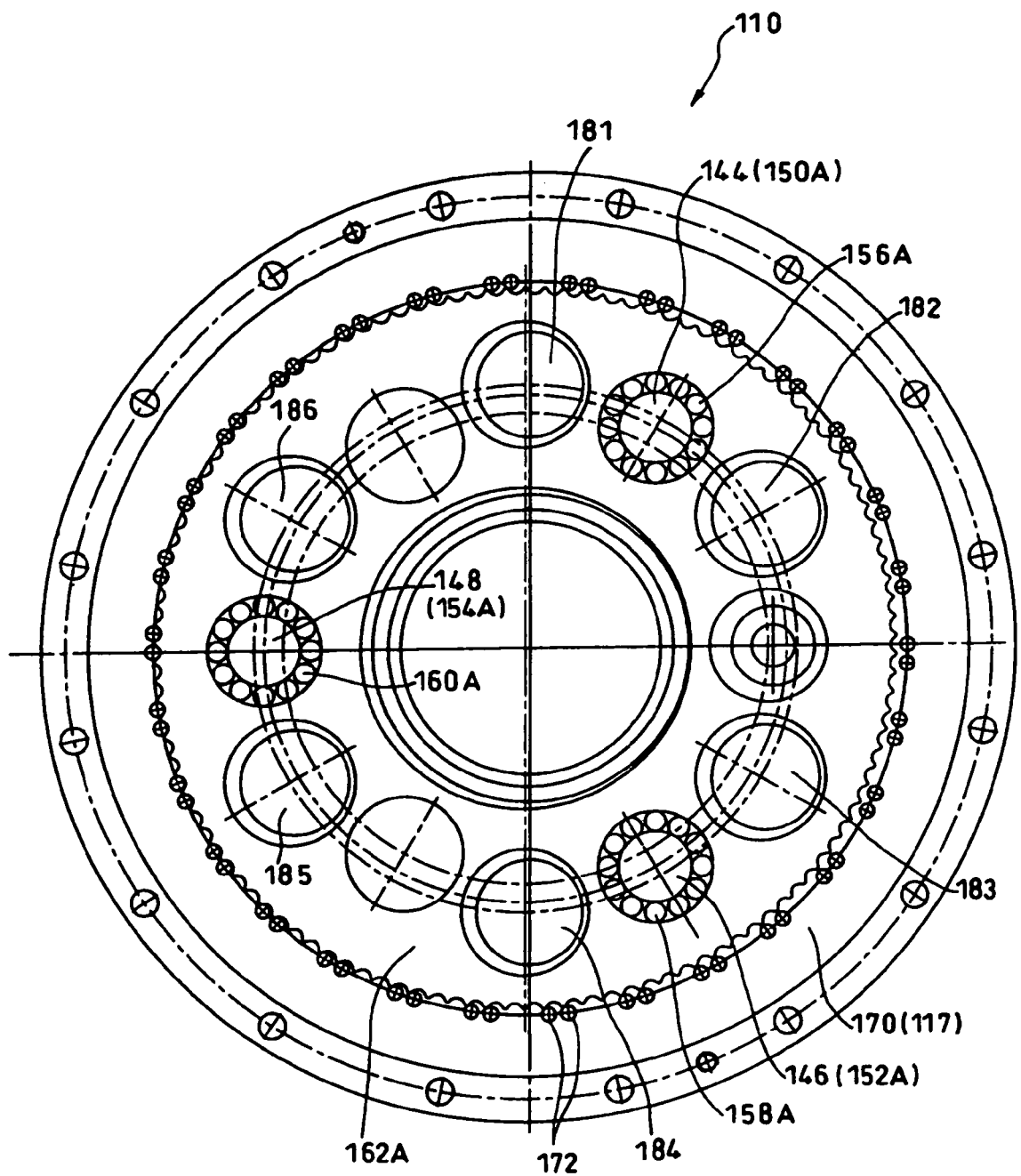
FIG. 4 is a sectional view taken along line IV to IV in FIG. 1.

FIG. 1 is a sectional view of the joint driving apparatus for a robot according to an exemplary embodiment of the present invention. FIG. 2 is an enlarged sectional view of major parts in FIG. 1. Further, FIG. 3 and FIG. 4 are respectively the sectional views taken along lines III to III and IV to IV in FIG. 1.

The joint driving apparatus 110 comprises an oscillating internally meshing reduction mechanism 118. The (oscillating internally meshing) reduction mechanism 118 is fixed to a base (first member) 112 constituting a part of a fixing block of the robot (not illustrated), and rotatably supports and drives a movable member (a second member) 114 constituting another part of a movable bock of the robot.

Incidentally, when the joint driving apparatus is used for a joint driving after the second step of a robot, a base (first member) corresponds to a preceding movable member. Therefore, it does not mean that the first member always does not move.

The joint driving apparatus 110 is substantially constituted with a motor 116 arranged on the movable member 114 and the reduction mechanism 118 having a planetary gear mechanism. A casing 117 of the reduction mechanism 118 is connected to the base 112 via a bolt 119.

A pinion 122 is formed at a tip of the motor shaft 120 of the motor 116 and meshed with a gear 124. The gear 124 is integrally formed with a driving shaft 128 via a spline 126. A driving pinion 130 is formed on the driving shaft 128. The driving pinion 130 is meshed with a center gear 132. The center gear 132 is fitted rotatably to an outer periphery of a center shaft member 136 via a roller 134.

By referring to FIG. 2 through FIG. 4 together, the center gear 132 is meshed with the driving pinion 130 and at the same time meshed with a plurality of eccentric body shaft gears 138, 140, 142. The eccentric body shaft gears 138, 140, 142 are formed integrally with eccentric body shafts 144, 146, 148 respectively. These eccentric body shafts 144, 146, 148 are supported to first and second carriers (output members) 176A, 176B to be described later via a tapered roller bearing TB so as to rotate freely.

The eccentric body shaft 144 is provided with eccentric bodies 150A, 150B made eccentric from the axis of the eccentric body shaft 144 (refer to FIG. 1 and FIG. 2). The eccentric body shaft 146 is provided with eccentric bodies 152A, 152B (the eccentric body 152B is not illustrated). The eccentric body shaft 148 is provided with eccentric bodies 154A, 154B (the eccentric body 154B is not illustrated). An external gear 162A is fitted to the eccentric bodies 150A, 152A and 154A respectively via rollers 156A, 158A and 160A. In an aspect similar to that in FIG. 4, eccentric bodies 150B, 152B, 154B are also fitted to an external gear 162B respectively via rollers 156B, 158B, 160B (the rollers 158B, 160B are not illustrated). The external gears 162A, 160B have 180° in eccentric phase difference with each other.

The external gears 162A, 162B are internally meshed with an internal gear 170 while oscillating. In the present embodiment, the external gears 162A, 162B have, for example, 118 teeth. The internal gear 170 is integrally formed with the casing 117. In the present embodiment, the inner teeth of the internal gear 170 are constituted with a roller-shaped outer pin 172. The inner teeth of the internal gear 170 (the outer pin 172) should originally be 120, but are formed (arranged) in a state that every two teeth are alternately eliminated.

The first and second carriers (output members) 176A, 176B are supported axially on the both ends of the external gears 162A, 162B so as to rotate freely by the casing 117 via bearings 178A, 178B. The casing 117 is integrally formed with a base (first member) 112. The first and second carriers 176A, 176B are connected and integrally formed by carrier pins 181 to 186. The previously-described movable member (a second member) 114 is connected to the first carrier 176A via a bolt 188.

In this case, a ring portion 190 is extended inwardly from the base (first member) 112 on the side opposite to the external gear in the axial direction of the second carrier 176B and faces a shaft portion 136A (to be described later) of the center shaft member 136. The ring portion 190 has a through hole 190A with the inner periphery D1, which is smaller than the outer periphery d2 of the second carrier (an output member)

176B (d2<D1). Since the ring portion 190 is integrally formed with the base 112, the ring portion is made from cast iron. In contrast, since the center shaft member 136 not only functions as a base body for receiving the load of the center gear 132 but also constitutes a sliding plane of the oil seal 192, the center shaft member 136 is made from steel.

The center shaft member 136 is provided with a center through hole (hollow portion) 136B for passing a control cable 139. The center shaft member 136 is integrally formed with the first and second carriers (output members) 176A, 176B, and also penetrates axially through the central part of the reduction mechanism 118. Further, the center shaft member 136 is provided at the axial end portion with a shaft portion (a part facing the ring portion 190) 136A, which is smaller in diameter than the inner diameter D1 of the through hole 190A of the ring portion 190. In other words, the shaft portion 136A means a part of the center shaft member 136, which is a cylindrical portion extended up to the side opposite to the external gear in the axial direction of the second carrier 176B (a position going beyond an axial position of the second carrier 176B over to the side opposite to the reduction mechanism 118: a position deviated below in FIG. 1 and FIG. 2). The outer diameter of the shaft portion 136A is d3. An oil seal 192 with the inner diameter D2 (corresponding to d3) for sealing inside and outside the reduction mechanism 118 is arranged at a clearance between the through hole 190A of the ring portion 190 and the shaft portion 136A of the center shaft member 136.

The oil seal 192 is to seal a clearance between the second carrier 176B (an output member) and the ring portion 190 integrally formed with the base 112 (a first member).

A step portion 136S, having a smaller diameter in the side opposite to the external gear 162B in the axial direction (diameter d5>diameter d4), is formed on the center shaft member 136. The center shaft member 136 is positioned integrally with respect to the second carrier 176B through the step portion 136S (refer to FIG. 2). A portion of the diameter d5 is press-fitted, and a portion of the diameter d4 is fitted with a small clearance. Since the portions of the diameters are set to d5>d4>d3, the center shaft member 136 can be assembled from the side of the external gear (towards lower in FIG. 2) (without an additional member or the like for fixing and positioning) to the second carrier 176B. The center shaft member 136 is positioned at the step portion 136S and also integrally formed with the second carrier 176B at the press-fitted portion of the diameter d5 so as to transmit the power. In addition, the first carrier 176A is covered from the side opposite to the external gear 162B (towards lower in FIG. 2) to the portion of a diameter d6 of the center shaft member 136. An O-ring 179 is arranged between the first carrier 176A and the center shaft member 136 so that a lubricant in the reduction mechanism 118 does not leak outside. In this embodiment, the first and second carriers 176A, 176B are arranged at the both side of the external gears 162A, 162B in the axial direction. Inner diameters d4 and d5 of the second carrier 176B (output member at a side opposite to a motor in axial direction) are set smaller than an inner diameter d7 of the first carriers 176A. The center shaft member 136 is positioned between a difference portion of the inner diameters d4 (d5) and d7. Therefore, an inner diameter d8 of the center shaft member 136 can be set the same as the inner diameter d7 of the first carrier 176A, so that the through hole 136A can be made larger and damage to wire harness can be made smaller.

In addition, the reference 194 given in the drawing represents an oil seal arranged between the outer periphery of the first carrier 176A and the inner periphery of the casing 117, the reference 196 represents an oil seal arranged between the driving shaft hole 177 of the first carrier 176A and the driving shaft 128. The reduction mechanism 118 is sealed inside and outside by these oil seals 192, 194, 196. Further, the present invention is applied with respect to the oil seal 192 in the present embodiment.

Next, a description will be given for actions of the joint driving apparatus 110.

The electric power of the motor 116 is transmitted to the driving pinion 130 via the pinion 122 formed on the motor shaft 120, the gear 124 meshed with the pinion 122, and the driving shaft 128 connected through the gear 124 and the spline 126. Upon rotation of the driving pinion 130, the center gear 132, which is meshed with the driving pinion 130, rotates, and the rotation of the center gear 132 is distributed to three eccentric body shaft gears 138, 140, 142 which are at the same time meshed with the center gear 132, thereby eccentric body shafts 144, 146 and 148 rotate in the same direction at the same rotational speed. As a result, the external gear 162A oscillates and rotates while being internally meshed with the internal gear 170 by eccentric bodies 150A, 152A, 154A on the eccentric body shafts 144, 146, 148. Further, at the same time, the external gear 162B oscillates and rotates while being internally meshed with the internal gear 170 in a similar manner by the eccentric bodies 150B, 152B, 154B of the eccentric body shafts 144, 146, 148 at the phase difference of 180° with respect to the external gear 162A.

A difference in the number of teeth between the internal gear 170 (originally "120") and the external gear 162A, 162B ("118") is respectively "2". Therefore, when the external gears 162A, 162B oscillate once, the external gears 162A, 162B rotate only by the difference of the number of the teeth. The rotational component is transmitted via the eccentric body shafts 144, 146, 148 to the first and second carriers 176A, 176B.

Since the first carrier 176A is integrally formed with a movable member 114 via a bolt 188, the movable member 114 rotates at a decreased rotational speed, together with the motor 116 arranged on the movable member 114.

In this case, the reduction mechanism 118 is sealed via the oil seals 192, 194, 196. Among these seals, in particular, the oil seal 192 arranged between the through hole 190A of the ring portion 190 and the shaft portion 136A of the center shaft member 136 can be kept very small in the inner diameter of D2, because the ring portion 190 is projected radially inwardly from the base 112. Therefore, the oil seal 192 can be reduced in cost. At the same time, as compared with a conventional case where the oil seal (44B) with a larger diameter (d1) is used, the peripheral speed is decreased and the sliding distance is shortened due to the smaller diameter D2, wear of the oil seal 192 is suppressed and improved in reliability (durability) for preventing leakage for a long time.

Further, the oil seal 192 has no relative rotation to the ring portion (a first member) 190, which is casted, but has a relative rotation to the shaft portion 136A of the center shaft member 136, which is formed with steel, an advantage of higher sealing performance can be obtained. This is because there is often found a porous area (small holes) in a sliding plane to result in leakage. However, no porous area is found in a steel sliding plane. Further, sliding on a steel-made portion is less likely to cause wear or damage to the oil seal 192 than sliding on a casted portion, and excellent sealing characteristics (higher durability) are accordingly obtained for a long time. This is one of the great advantages as compared with a conventional case where the casted-sliding plane on the outer periphery of the output member is used for the oil seal.

Figure 6:
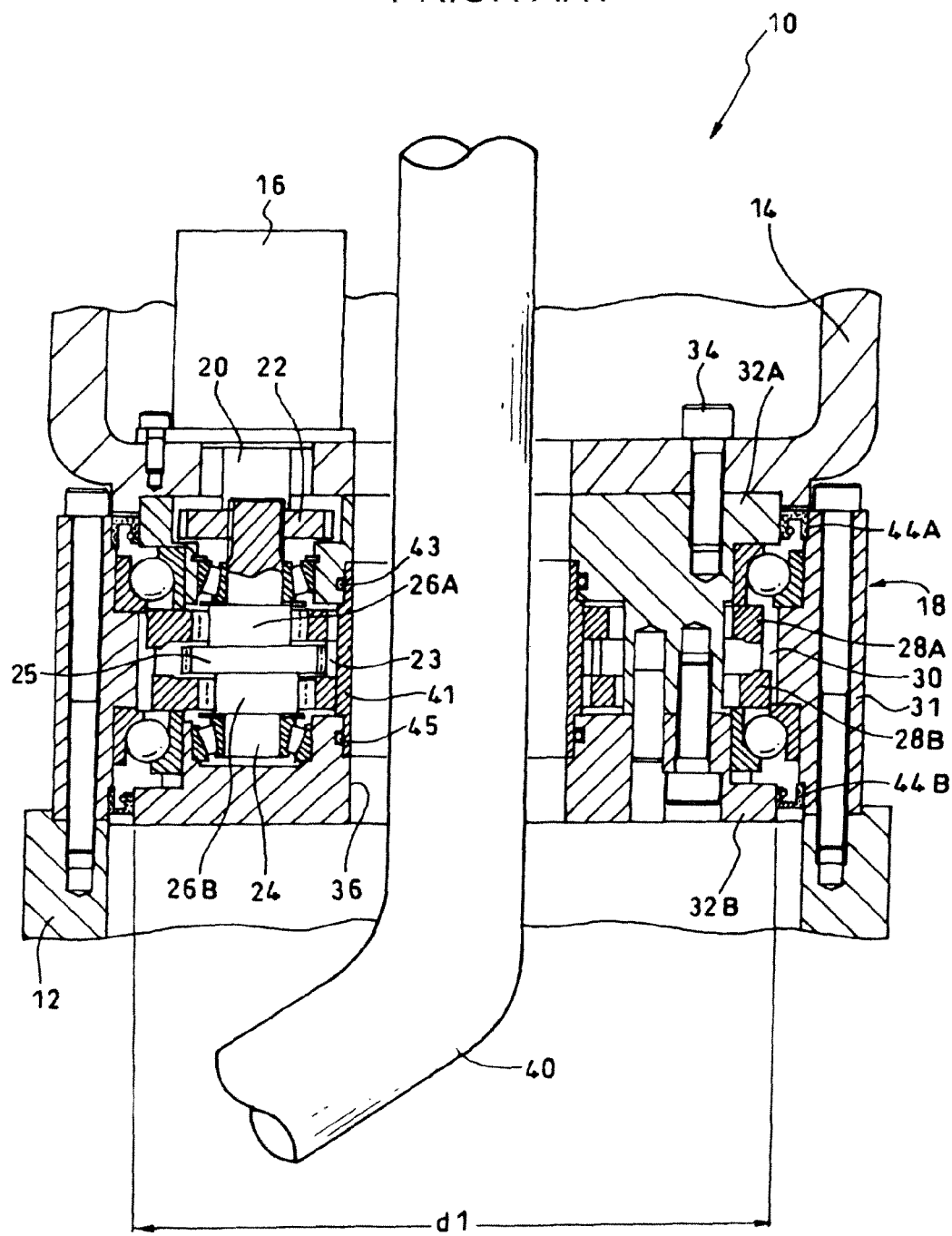
FIG. 6 is a longitudinal sectional view showing one example of a conventional joint driving apparatus for a robot.

Still further, the oil seal 192 also functions as the O-ring 45, which is used in the above-described conventional example (FIG. 6), thus omitting the necessity for installing an O-ring corresponding to the O-ring 45 to decrease the number of parts.

In addition, in the present embodiment, the ring portion 190 is integrally formed with the base 112 by casting (cast iron), thus making it possible to decrease the number of parts and cost.

Figure 5:
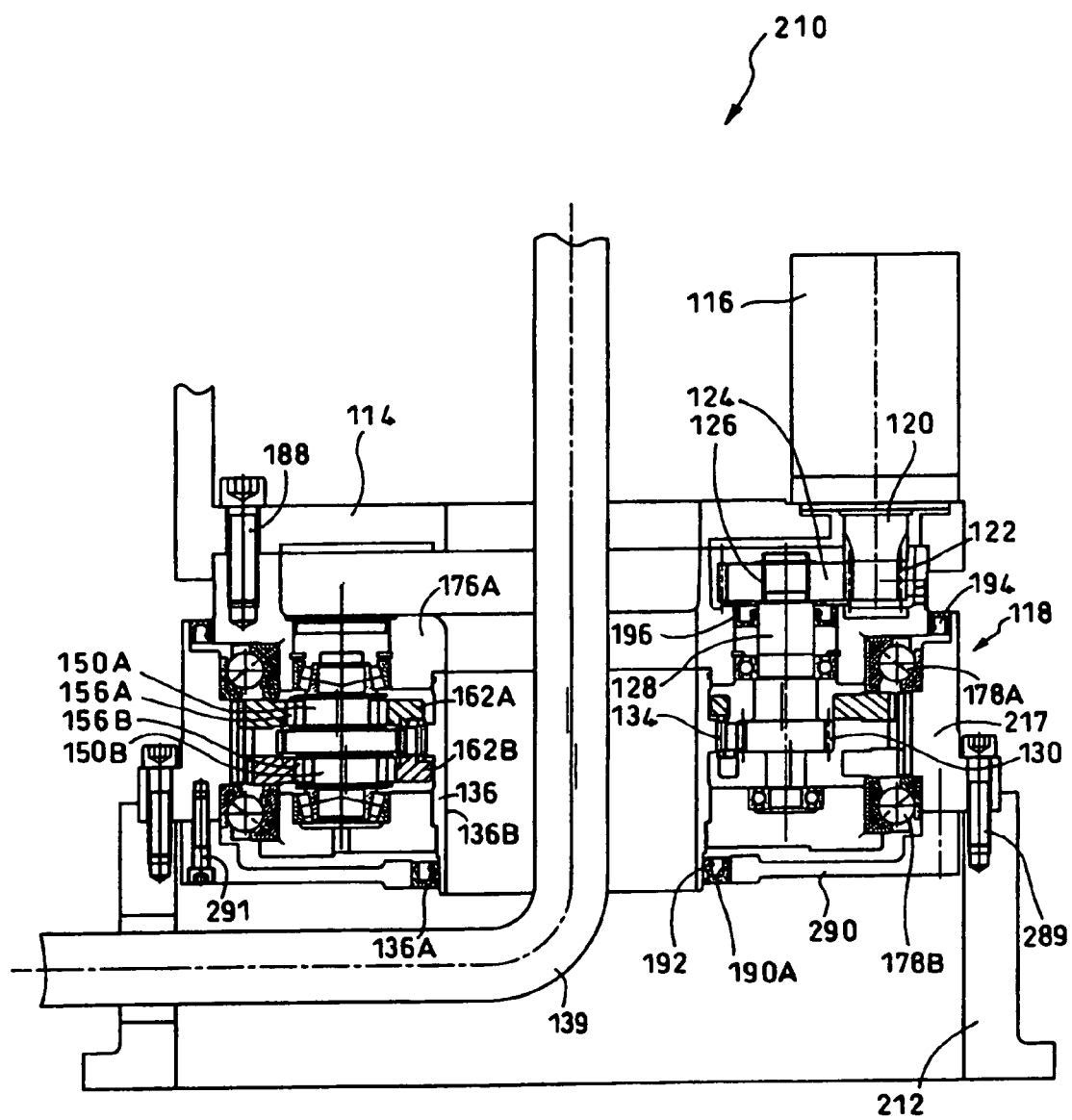
FIG. 5 is a longitudinal sectional view corresponding to FIG. 1 which shows the joint driving apparatus for a robot related to another embodiment of the present invention.

Next, a description will be given for another exemplary embodiment of the present invention by referring to FIG. 5. In the joint driving apparatus 210, the ring portion is not integrally formed with the base but formed by an independent ring member 290, which is fixed to a casing 217 via a bolt 291. The casing 217 is integrally formed with the base (a first member) 212 via the bolt 289. Consequently, this constitution is also able to keep the ring member (a ring portion) 290 fixed to the base 212 (first member).

In the present embodiment, since the ring portion is formed with the independent ring member 290, an advantage that the base 212 mounted on the joint driving apparatus 210 can be designed at a higher degree of freedom can be obtained.

Since other constituents are the same as those of the previous embodiments, the same references are given to the same parts in the drawings, a description of which will be omitted here.

In addition, in the above embodiment, the present invention is not applied to the oil seal 194 on the first carrier 176A. However, for example, in a case where a motor is positioned differently from this embodiment, the present invention may be applied to the first carrier. As a matter of course, in the present invention, such a case is not prohibited. Further, in the above embodiment, the reduction mechanism is constituted with an oscillating internally meshing planetary gear mechanism. However, the reduction mechanism of the present invention shall not be limited to the above constitution.

The disclosure of Japanese Patent Application No. 2007-154323 filed Jun. 11, 2007 including specification, drawing and claim are incorporated herein by reference in its entirety.

What is claimed is:

1. A joint driving apparatus for a robot, comprising:
   an oscillating internally meshing reduction mechanism fixed to a first member and rotating a second member relatively with respect to the first member,
   the first member constituting a part of a fixing block of the robot, the second member constituting a part of a movable block of the robot,
   the oscillating internally meshing reduction mechanism having an external gear, an internal gear meshing with the external gear,
   an output member arranged at the side of the external gear in an axial direction so as to output a relative rotation of the internal gear with the external gear, the output member being connected to the second member;
   a center shaft member fixed to the output member, the center shaft member being a hollow shaft with a hollow portion penetrating through a central part of the oscillating internally meshing reduction mechanism, the center shaft member having a shaft portion extending axially beyond the output member and up to the side opposite to the external gear;
   a ring portion integrally formed with the first member and extended inwardly at the side opposite to the external gear in the axial direction of the output member, the ring portion facing the shaft portion of the center shaft member; and
   an oil seal disposed between the ring portion and the shaft portion of the center shaft member rotating relatively with the ring portion.

2. The joint driving apparatus for a robot according to claim 1,
   the oscillating internally meshing reduction mechanism comprises:
   a center gear fitted rotatably to the outer periphery of the center shaft member;
   a plurality of eccentric body shaft gears meshing with the center gear at the same time; and
   an eccentric body shaft to which each of the eccentric body shaft gears and an eccentric body made eccentric to the axis of the eccentric body shaft are incorporated, the eccentric body shaft being supported by the output member;
   wherein the rotation of a motor is distributed to the rotation of a plurality of the eccentric body shafts via the center gear and the eccentric body shaft gear, the external gear oscillates and internally meshes with the internal gear via the eccentric bodies provided on each of the eccentric body shafts, a component of the relative rotation of the external gear with the internal gear is output from the output member via the eccentric body shaft.

3. The joint driving apparatus for a robot according to claim 1, wherein the ring portion is integrated with the first member, to project and extend therefrom.

4. The joint driving apparatus for a robot according to claim 1, wherein the ring portion is constituted with a member different from the first member.

5. The joint driving apparatus for a robot according to claim 1, wherein the ring portion is formed with cast iron, and the center shaft member is formed with steel.

6. The joint driving apparatus for a robot according to claim 1, wherein a step portion is formed on the center shaft member, the step portion has a smaller diameter in the side opposite to the external gear in the axial direction, and the center shaft member is positioned and integrated with respect to the output member through the step portion so as to transmit a power.

7. The joint driving apparatus for a robot according to claim 1, further comprising:
   a second output member connected to the output member, the second output member being arranged at the side opposite to the external gear in the axial direction of the output member, wherein an inner diameter of the second output member at a side opposite to a motor in the axial direction is set smaller than an inner diameter of the second output member at a motor side, and the center shaft member is positioned between a difference portion of the inner diameters.

* * * * *